United States Patent [19]

Young

[11] 4,041,133

[45] Aug. 9, 1977

[54] AMMONIUM POLYPHOSPHATE PRODUCTION

[75] Inventor: Donald C. Young, Fullerton, Calif.

[73] Assignee: Union Oil Company of California, Brea, Calif.

[21] Appl. No.: 605,016

[22] Filed: Aug. 15, 1975

[51] Int. Cl.² .............. C01B 15/16; C01B 25/26; C05B 11/00

[52] U.S. Cl. .................. 423/305; 423/310; 423/313; 71/43

[58] Field of Search .............. 423/309–313, 423/305, 470, 315; 71/43, 34

[56] References Cited

U.S. PATENT DOCUMENTS

| | | | |
|---|---|---|---|
| 1,971,563 | 8/1934 | Hirschkind | 423/310 |
| 2,902,342 | 9/1959 | Kurley | 423/310 |
| 3,310,371 | 3/1967 | Lutz | 423/310 |
| 3,775,534 | 11/1973 | Meline | 423/310 |
| 3,939,255 | 2/1976 | Moore | 423/313 |

Primary Examiner—O. R. Vertiz
Assistant Examiner—Gregory A. Heller
Attorney, Agent, or Firm—Richard C. Hartman; Dean Sandford; Michael H. Laird

[57] ABSTRACT

Stable aqueous ammonium phosphate containing a higher proportion of polyphosphates is obtained by reacting phosphoric acid with ammonia in the presence of sulfuric, nitric or hydrochloric acids under conditions sufficient to produce a partially neutralized melt containing polymeric phosphates at a temperature between 400° and about 750° F. by the autogenous heat of neutralization, quenching and further neutralizing the melt.

11 Claims, 5 Drawing Figures

FIG. 1.
CONVERSION TO POLYPHOSPHATES OF 100% EFFICIENCY

AMMONIUM POLYPHOSPHATE PRODUCTION

BACKGROUND OF THE INVENTION

The utility and advantages of aqueous ammonium phosphate solutions are well known, particularly in the agricultural industry. Several advantages associated with the presence of acyclic polyphosphates are also recognized. For instance, products obtained from wet-process acids generally contain metallic impurities including iron, magnesium, aluminum and the like, which form unmanageable precipitates upon neutralization of acids containing insufficient polymeric phosphate. Secondly, ammonium phosphate solubility increases in proportion to polymeric phosphate content. Thus, an acid having an $H_2O/P_2O_5$ molar ratio of 3 corresponding to a polyphosphate content of 10 percent based on total $P_2O_5$, can be converted directly to the ammonium phosphate solution commerically designated as 8-24-0 containing 8 weight percent nitrogen and 24 weight percent phosphate expressed as $P_2O_5$. The more concentrated solution 10-34-0 containing 10 and 34 weight percent nitrogen and $P_2O_5$, respectively, requires the use of ammonium phosphate of which at least 50 percent of the $P_2O_5$ is polymeric. Similarly, 12-44-0 can be obtained only with ammonium phosphates in which 75 percent or more of the $P_2O_5$ is polymerized. Maximum solubilities varies somewhat with pH and temperature, and are obtained under slightly acidic conditions, ie., pH levels below about 7, generally on the order of about 6.5. However, polyphosphate stability increases with pH with the result that pH should be at least about 5, preferably above about 6.

Starting materials include essentially any source of phosphoric acid including wet-process acids, so-called white acids, and the like. The wet-process acids are obtained by acidifying phosphate-containing rock with strong mineral acids such as sulfuric, which convert the calcium or other metal phosphates to phosphoric acid, calcium sulfate, etc. Insoluble sulfates are removed by filtration although the wet-process acids generally contain at least about 1 and often between about 1 and about 20 weight percent cogeneric metallic impurities expressed as the corresponding oxides.

The so-called "white acids" are obtained by the electric furnace process in which phosphate-containing rock is reduced by reaction with coke at extremely high temperature generated by electrical current. The phosphate rock is reduced to elemental phosphorus, which is then burned to $P_2O_5$ and absorbed in water. While these acids are generally more expensive than wet-process acids, they often become available at prices low enough to justify their use in the manufacture of ammonium phosphates.

The possibility of increasing polymeric content by driving off free and chemically combined waters, i.e., polymerizing the acid, at very high temperatures, has been recognized for some time. Temperatures required to obtain any significant conversion to polymeric $P_2O_5$ are at least about 400° F., usually between about 500° and about 750° F.

Earlier attempts at polymerization involved heating the crude acid, i.e., an acid having a relatively high $H_2O/P_2O_5$ ratio, with an external heating source, to obtain the required polymerization, then neutralizing the polymerized product. It was then discovered that the required temperatures could be generated by the autogenous heat of neutralization with ammonia. This procedure accomplished two objectives in one step — phosphate polymerization and ammonium phosphate or polyphosphate formation. This process could be carried out in either a batch or continuous basis, the latter often involving the use of so-called tubular reactors in which ammonia and the phosphoric acid feed were continuously passed through and contacted in the reactor tube. Numerous variations of both batch and continuous operations have been suggested.

All of these processes require relatively concentrated phosphoric acid feeds in order that the heat of neutralization will be sufficient to reach the required temperatures. For several reasons, the maximum temperatures obtainable by adiabatic neutralization decrease markedly as the $H_2O/P_2O_5$ feed ratio increases. Reaction efficiency, which also depends on several variables, also effects maximum reaction temperature and, consequently, influences conversion, i.e., polymerization level. Even the best designed and controlled reactors can obtain at most 90 percent, and generally less than 90 percent of the theoretical polymer content.

These and other factors make it highly impractical and often impossible to obtain a required polymer content from a given acid feed without preconcentration of the acid to reduce $H_2O/P_2O_5$ ratio prior to neutralization.

It is therefore one object of this invention to provide an improved method for converting phosphoric acids to ammonium phosphates. It is another object to provide a method for producing stable aqueous solutions of ammonium phosphates containing substantial amounts of ammonium polyphosphate. These and other objectives, variations and modifications of the concepts of this invention will be apparent to one skilled in the art in view of the following description, drawings and claims.

Therefore, in accordance with one embodiment, aqueous solutions of ammonium polyphosphates in which at least 25 percent of the $P_2O_5$ is present as polyphosphate, are produced by mixing with the feed acid an anhydrous mineral acid selected from sulfuric, nitric and hydrochloric acids, in amounts of at least about 0.05 mole of mineral acid per mole of $P_2O_5$ sufficient to produce a liquid phase temperature in the reaction melt of about 400° to about 750° F. upon adiabatic neutralization of the acid mixture with anhydrous ammonia. In another embodiment, similar conversions are obtained with feed acids having equivalent $H_2O/P_2O_5$ mole ratios about about 3.3 and as high as 15.

The amount of ammonia required to obtain this objective is generally on the order of at least about 0.12 weight part of anhydrous ammonia per weight part of the acid mixture, i.e., $P_2O_5$ plus mineral acid equivalent. In this disclosure the term "mineral acid" refers only to the additional sulfuric, nitric and/or hydrochloric acids. The term "mineral acid equivalent" refers to the molar equivalent acidity of the mineral acid at the conditions involved, i.e., the extent to which it will react with ammonia.

Reaction conditions are controlled to produce a product melt, using essentially only the autogenous heat of neutralization, at a temperature sufficient to increase the polyphosphate content by at least about 10 percent based on total $P_2O_5$ as compared to the feed acid, and form a product of which at least about 25 percent of the $P_2O_5$ is present as polyphosphate. The product melt is then quenched and neutralized, preferably to a temperature of about 200° F. or less, generally by immersion in an aqueous medium.

The several concepts involved in the use of this invention can be better understood by reference to the drawings of which.

Efficiency is here expressed as the percentage of polymeric $P_2O_5$ actually obtained as compared to the percentage which would be obtained at the theoretical 100 percent efficiency level. Thus, it is possible to interpolate between the constant efficiency lines in FIG. 1 to determine, for instance, what $H_2SO_4/P_2O_5$ molar ratio would be required to obtain a certain polymer content from a feed having a given $H_2O/P_2O_5$ molar ratio in a system having an efficiency of, say, 80 percent.

While this invention contemplates the use of either sulfuric, nitric or hydrochoric acids, or mixtures of these for purposes of simplicity, it is described primarily with reference only to sulfuric acid. The effects of each of these acids on the reaction are approximately the same on a molar basis. For instance, hydrochloric acid increases reaction temperature by about 5 percent more than an equal molar amount of sulfuric acid. Thus, theoretically, hydrochloric acid would induce a 105° F. temperature increase when used in a molar amount equal to the quantity of sulfuric acid required to produce an increase of 100° F. This difference is generally so slight that it is completely over-shadowed by other process parameters. Consequently, these three acids, or combinations thereof, can be considered essentially identical so far as they influence this process.

The process can be carried out in a variety of apparatus including batch or continuous flow systems such as the so-called "pipe reactors" of which numerous varieties are known. A particularly preferred system is described in copending application Ser. No. 591,056 of Harbolt and Young wherein the reaction is carried out in a highly dispersed, discontinuous, unconfined liquid phase surrounded by an ammonia atmosphere. That system is similar to the one illustrated in FIG. 5 detailed hereinafter.

Phosphoric acid feed can be obtained from essentially any source so long as the $H_2O/P_2O_5$ ratio, determined on the basis of the total liquid water introduced to the system with any component in either free or chemically combined form is within the prescribed ranges. The most common feed acid sources are the white acids and wet-process acids. The phosphoric acid feed can also contain substantial amounts of polymeric phosphates, although it will usually contain less than 30, often less than 25 percent polymer. However, these methods are of greatest advantage with feeds containing less than 10 percent polyphosphate, and preferably containing no polymer at all.

$H_2O/P_2O_5$ molar ratio is determined on the basis of total unvaporized water. Little, and preferably no unvaporized water is introduced with the ammonia. Consequently the majority, if not all, of the unvaporized water is introduced as free of chemically combined water with the phosphoric or mineral acids. This invention is of greatest advantage when that ratio exceeds 3.3 and is generally between about 3.3 and about 15. Even greater advantage is realized with acids having $H_2O/P_2O_5$ ratios of about 4.5 or more or even about 5 or more due to the fact that this method will yield acceptable polyphosphate levels that can not be obtained by available alternative methods from similar feeds. Accordingly, this ratio will generally be between about 4.5 and about 15, preferably between about 5 and about 10. Nevertheless, these methods can also serve to increase conversion, even with concentrated feeds, i.e., acids having $H_2O/P_2O_5$ ratios below 3.3. Temperature is limited by both water content and efficiency neither of which are ideal, even in the best systems. Thus, these methods increase conversion even in those instances.

While the wetter feeds, i.e., those having $H_2O/P_2O_5$ ratios between about 10 and about 15 can be employed, higher ratios should be avoided, and levels within this range, i.e., 10 to 15, are preferably avoided due to the difficulty in controlling the extremely rapid water evolution and the difficulties involved in maintaining an even temperature distribution throughout the liquid phase required to avoid the formation of ammonium phosphate-ammonium sulfate, nitrate and/or ammonium chloride crusts. These crusts, if formed, inhibit ammonia transfer across the vapor-liquid interface. It is essential that the reaction be sufficiently rapid to obtain liquid phase temperature above the salt melting point in order to avoid crust formation and assure the maintenance of a single liquid phase. This is particularly true in the case of the unconfined liquid phase reaction system — such as that illustrated in FIG. 5.

While the reasons for the success of such unconfined liquid phase reactors are not completely understood, it appears that reaction rate is increased sufficiently to generate heat at a rate greater than it is transferred to the immediate environment, even at the high reaction temperatures required. The rate of liquid phase temperature increase is necessarily a function of the rate of neutralization of the phosphoric and added mineral acid. This in turn involves the rate at which ammonia permeates the liquid phase. This would be true either in a discontinuous liquid phase or in the continuous liquid phases prevailing in both batch or tubular reactors.

In either situation, heat transfer rate, and consequently temperature elevation rate, are reduced by one or more types of heat transfer barriers or inhibiting films at the liquid-vapor interface due to one or more characteristics of the phosphoric acid feed, the combination of phosphoric acid and added mineral acid, the reaction products of one or both of these with ammonia, or some intermediate forms, or combinations thereof. Accordingly, when operating with the high water content acids employed herein, it is essential to assure that the combination of phosphoric and mineral acids is sufficient to obtain the reaction rate required to produce temperatures in excess of the ammonium phosphate melting point and avoid the formation of mass transfer limiting crusts or films.

It was not initially apparent that parameters could be found or, if found, could be controlled to maintain these essential balances. For instance, Y.A.K. Abdul-Rahman and E. J. Crosby observed the formation of an impervious crust upon treatment of phosphoric acid droplets with ammonia. Their results are reported in "Direct Formation of Particles from Drops by Chemical Reaction With Gases", Department of Chemical Engineering, University of Wisconsin, Madison, Wisconsin, appearing in *Chemical Engineering Science* (1973), Vol. 28, pages 1273–1284. The efforts of these authors, as indicated by the title of their work, was directed to the formation of solid droplets of ammonium phosphate. While their investigations were carried out at temperatures far below those required to promote polymerization, and at contact times far exceeding commercially practicable holding times, they did observe several factors which appeared to negate the utilizy of this process. These included the rapid formation of a crust surrounding the droplets, the attainment of only very low temperatures, even with anhydrous ammonia, and the actual explosion of the droplets in some cases due to containment of vaporized water by the ammonium phosphate crust.

These methods involve a number of variables, the most significant being $H_2O/P_2O_5$ and mineral acid/$P_2O_5$ molar ratios. If the required conditions are not maintained the elevated temperatures required for polymerization can not be reached, and the rate of the water release and the temperature increase will be insufficient to reach the product melting point prior to the occurrence of solid or semisolid crusts in the liquid phase.

The mineral acids should be anhydrous, i.e., should contain less than 5, preferably less than 2 weight percent free water. The accompanying drawings illustrate that the mineral acid/$P_2O_5$ ratio must be correlated with $H_2O/P_2O_5$ ratio and reaction temperature required to obtain a specified conversion level. As a general rule, however, this ratio will be at least about 0.05, preferably at least about 0.1. In the preferred embodiment, however, using feed acids having $H_2O/P_2O_5$ molar ratios of about 5 or greater, this ratio should correspond to at least about 0.17, and will generally fall within the range of about 0.17 to about 4.

Figure 1:
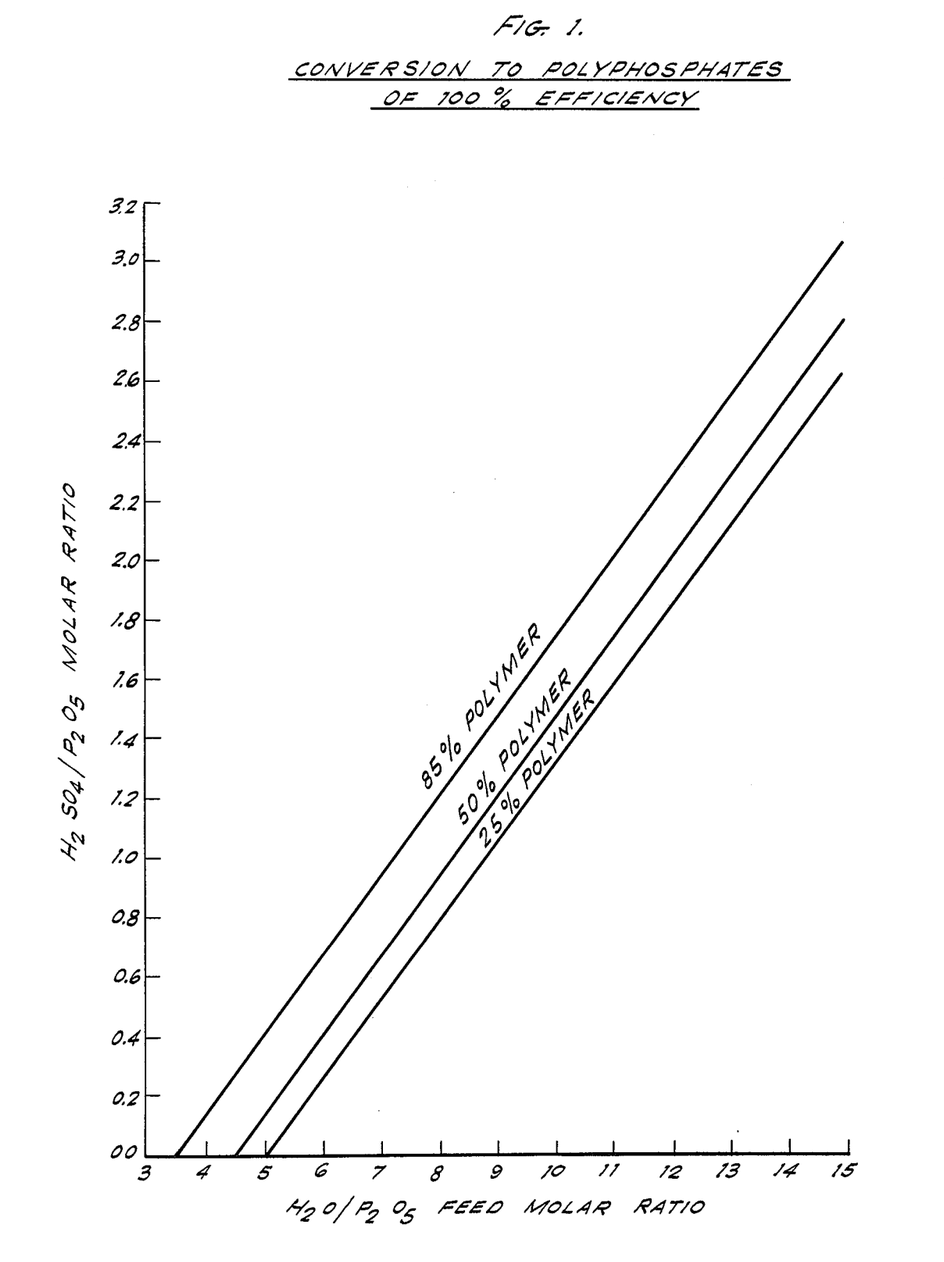
FIG. 1 is a graphical representation of the interrelationship of $H_2O/P_2O_5$ feed ratio, $H_2SO_4/P_2O_5$ molar ratio, and percent conversion, i.e., percent polymeric $P_2O_5$ in the product assuming 100 percent efficiency. Of course, 100 percent efficiency is impossible to obtain, the best possible efficiencies being on the order of about 80 to about 90 percent. Poor control of process conditions and/or high heat losses can lower efficiency to 60 percent or less.
Figure 2:
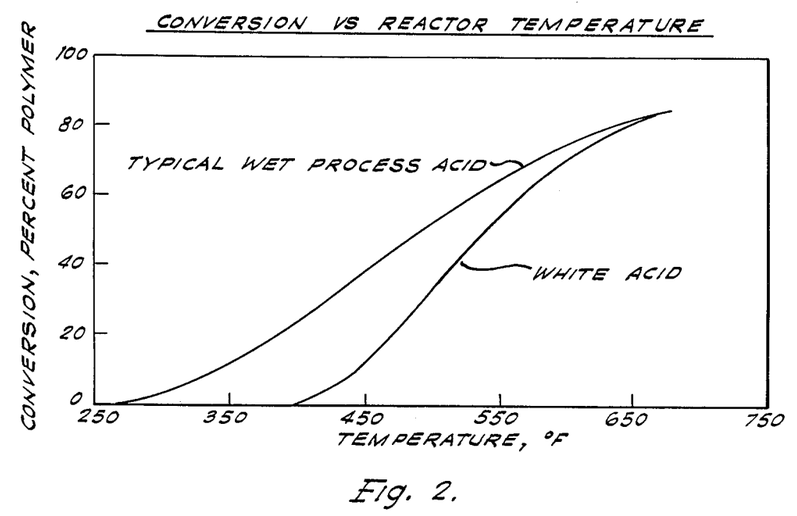
FIG. 2 is a graphical representation of the manner in which conversion level is influenced by maximum reaction temperature for typical wet-process and white acids. The wet-process acid was typical of a material having an $H_2O/P_2O_5$ ratio of about 7 and containing about 10 weight percent cogeneric metallic impurities determined as the corresponding oxides. The white acid contained less than 1 weight percent impurities and is representative of a material having an $H_2O/P_2O_5$ ratio of 8.
Figure 3:
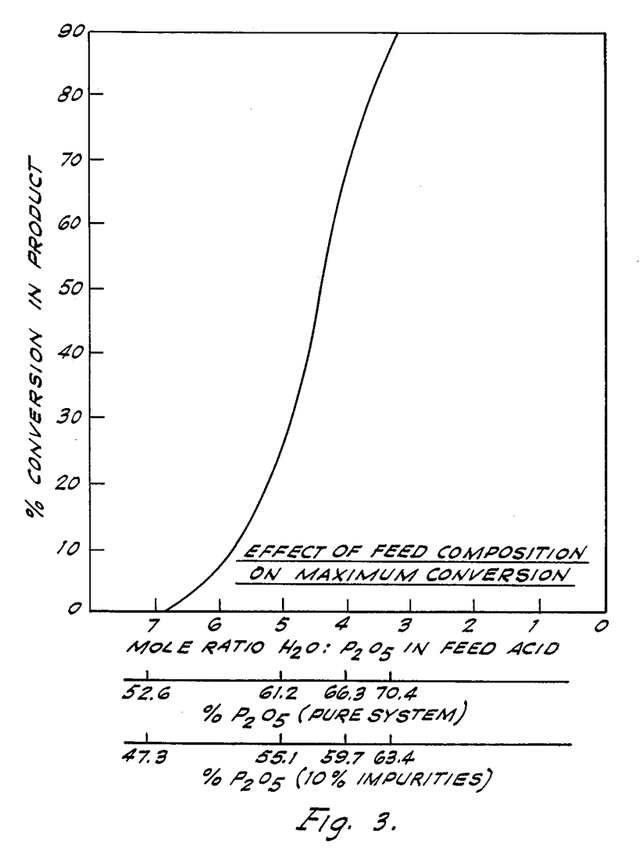
FIG. 3 is a graphical representation of percent conversion to polyphosphates as a function of feed $H_2O/P_2O_5$ mole ratio for both pure and typical impure (wet-process) systems in an ideal adiabatic reactor operating at 100 percent efficiency without benefit of this invention.

In most instances it is preferable to obtain a product of which at least 25 percent of the $P_2O_5$ is present as a polyphosphate. Thus the mineral acid/$P_2O_5$ ratio should be at least about 10 percent greater than that represented by the correlation for 25 percent polymer shown in FIG. 1 at an $H_2O/P_2O_5$ ratio corresponding to that of the system. As mentioned above, FIG. 1 represents a correlation for an assumed ideal situation, i.e., a batch reactor achieving 100 percent efficiency. Thus the 10 percent differential above that called for by this correlation, in part, accounts for the inefficiency of actual flow systems and allows some leeway for process control sensitivity. Taking all of these factors into account, the interrelationship of these variables can be illustrated by the expression:

$$[\text{mineral acid}]/P_2O_5 = 0.267\,[H_2O/P_2O_5] - 1.16.$$

This expression holds true for conversion of phosphoric acid containing less than 25 percent polyphosphates to products containing at least about 50 percent polyphosphates determined as $P_2O_5$.

It is also preferable to employ anhydrous ammonia containing less than 5 volume percent water and to introduce the ammonia to the reactor at a temperature above the dewpoint. Ammonia injection rates into the reaction zone per se (as opposed to downstream of the reactor) should correspond to at least about 40, and generally about 40 to about 70 percent of the amount required to neutralize the acid mixture.

Figure 4:
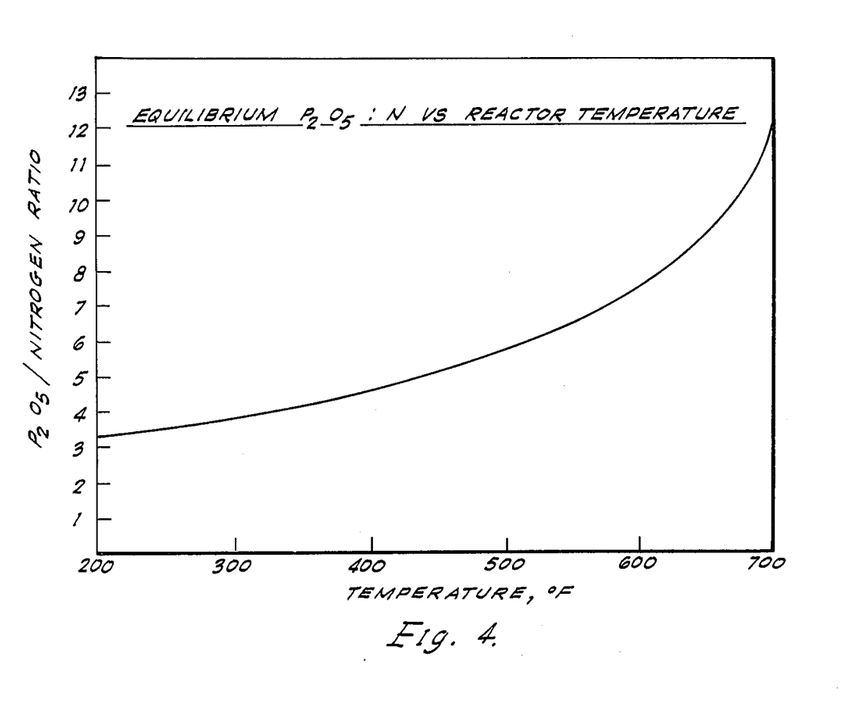
FIG. 4 is a graphical representation of the $P_2O_5$/nitrogen ratio in the liquid reactant phase prior to quench at equilibrium as a function of liquid phase temperature including only that nitrogen combined as ammonium phosphate, i.e., excluding nitrogen present as ammonium sulfate, nitrate or chloride.

FIG. 4 illustrates that the amount of nitrogen associated with the molten phosphate reaction phase decreases substantially as temperature is increased. This is true of both phosphoric and sulfuric acid, the latter of which is neutralized only to ammonium bisulfate at reaction temperatures. Thus, as a practical matter, the nitrogen required to produce the neutralized end product can not be consumed in the reaction zone per se, but must be absorbed at some point downstream of the reactor, e.g., after quenching.

Therefore, as a general rule ammonia addition rate to the reactor should correspond to at least about 0.12, generally about 0.12 to about 0.4 weight parts ammonia per weight part $P_2O_5$. In addition to this amount, sufficient ammonia should be added to neutralize the mineral acid to the maximum extent possible at reaction temperature.

Reaction conditions, including the water and acid ratio, ammonia addition rate, and reactor holding time, should be correlated to obtain a reaction temperature within the range of about 400° to about 750° F., preferably 500° to 750° F. and sufficient to produce a product containing at least 10 percent more of the $P_2O_5$ as polyphosphate than was present in the phosphoric acid feed. These conditions should generally be sufficient to produce a product containing at least about 25 percent, preferably at least about 50 percent of the $P_2O_5$ as polymeric phosphates. In the preferred, discontinuous liquid phase system, these conditions should be sufficient to increase the polymeric phosphate content by at least about 10 percent determined as total $P_2O_5$ within about five feet of the acid spray means described therein.

Sulfuric acid is neutralized to ammonium bisulfate, most of which remains in the product solution and contributes to the value of this material for agricultural applications as a source of both sulfur and nitrogen. Ammonium chloride or nitrate can also be retained in the product by operating with a closed reactor and quenching the melt in or immediately after the reaction zone.

However, if desired, substantial amounts, e.g., an excess of about 50 percent, of the ammonium chloride or nitrate can be removed from the melt prior to quenching. I have observed that these materials can be emitted as a vaporous fog from the partially neutralized melt if the melt is maintained at a temperature in excess of about 300° and preferably over 400° F. This objective can be readily accomplished by venting the reactor to a scrubber or passing the product melt from the reaction zone to any one of the numerous types of accumulating devices such as a separation vessel over which a vapor space is maintained. The chloride or nitrate can be continuously withdrawn from the vapor space overlying the hot product melt. The product should be rapidly quenched to a temperature below about 200° F. and neutralized to a pH above about 5.5 by direct immersion in water or an aqueous product solution.

The products are characterized as stable aqueous solutions containing at least about 15 weight percent $P_2O_5$ of which at least 10, and preferably at least about 20 percent more of the total $P_2O_5$ is polymeric phosphate than was present in the phosphoric acid feed. Polyphosphate levels will generally correspond to at least about 25, often at least about 40, and preferably at least about 50 percent of total $P_2O_5$. It is also preferable to minimize the chloride content of products intended for agricultural use, as described above, to less than about 50 and preferably less than 20 percent of the amount produced by neutralization of hydrochloric acid, when used.

The operation of this invention is described with reference to the embodiment illustrated schematically in FIG. 5. The acid feed — a combination of the phosphoric and mineral acids — is dispersed as a discontinuous liquid phase in an unconfined reaction zone and, in that condition, is reacted with ammonia injected into the acid spray within the reaction zone. The degree of dispersion achieved by any given spray means is at least, in part, a function of feed viscosity. Thus, as the viscosity of the feed increases, the degree of dispersion is reduced. Nevertheless, adequate dispersion can be maintained even with highly viscous acid feeds by heating the acid to a temperature between about 250° and about 500° F. Temperatures substantially above this level should be avoided with wet-process acids to prevent cyclic metaphosphate production and apparatus fouling upstream of the reactor or within the acid spray means itself. While there is, of course, no precise feed acid viscosity above which feed preheating should be employed, this embodiment is particularly useful with feeds having viscosities above about 4000 centipoise at 80° F.

Under any circumstances the feed acid temperature should be at least about 50° F., preferably at least about 100° F. With the more viscous feeds, temperatures on the order of 200° to about 500° F. are presently preferred. In fact, substantial advantage is realized by heating the feed acid, regardless of initial viscosity. Preheating reduces the heat load required to elevate liquid phase temperature. However, this aspect is of only minor significance when compared to the latent heat of vaporization involved in expelling water from the liquid reaction phase.

The mineral acid, in addition to serving the objectives described above, also reduces acid viscosity. Thus it reduces viscosity, increases acid dispersion and distribution and reduces droplet size.

Figure 5:
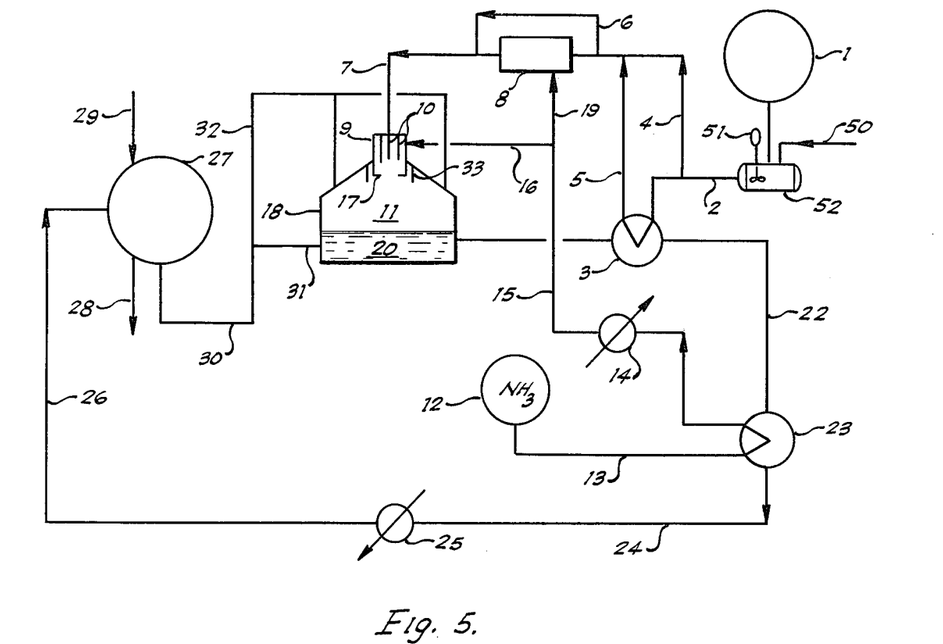
FIG. 5 is a schematic flow diagram of one conversion system envisioned within the concept of this invention.

Referring now to FIG. 5, phosphoric acid is passed from reservoir, pipeline or other container 1 to mixer 52 where it is combined with mineral acid entering by line 50. These materials are mixed by any suitable means such as agitator 51. The combination is then passed to the reaction zone through lines 2, 4, 6 and 7 to acid-spraying means 9. The feed may be heated, as described, by passage through heat exchanger 3 and lines 5, 6 and 7 as before.

In an alternative embodiment, preheating can be achieved by passing a portion or all of the acid through preneutralizer 8 where it is contacted with ammonia entering via line 19. The ammonia rate to neutralizer 8 should be sufficient to only partially neutralize the acid mixture and increase its temperature to a level in the range of about 200° to about 500° F.

More importantly, however, the extent of preneutralization should not be so great as to prevent the possiblity of obtaining the high temperature required in reaction zone 11 to produce the desired conversion. Thus it is presently preferred that the amount of ammonia introduced into neutralizer 8 be below about 0.1, preferably below about 0.05 weight parts ammonia per weight part $P_2O_5$ plus mineral acid. Of course feed temperatures above about 200° F. will require pressure control systems, pumps and valves not illustrated. Preferably, sufficient pressure is maintained at that point to prevent steam flashing within the process lines prior to the ejection of the feed acid from nozzle 9.

Ammonia can be obtained either as a gas or liquid from a tank or pipeline 12 and passed to the reaction zone through nozzle 9 directly through lines 13, 15 and 16 and intermediate heat exchanger 23 and heater 14. Depending on the ammonia storage conditions, heat exchangers 23 and heater 14 may or may not be required. In the event that ammonia is obtained as a liquid, sufficient heat should be added to completely vaporize the ammonia prior to ejection into the reaction zone.

Ammonia feed rate is controlled in proportion to the acid feed rate to obtain the highest liquid phase temperature in zone 11. While the total ammonia required for neutralization can be added to the reactor, maximum reaction temperatures are obtained generally by adding about 40 to about 70 percent of this amount to the reactor and injecting the remainder elsewhere in the system such as to quench zone 20, product and recycle lines, accumulator 27, or the like. Due to equilibrium limits, this range corresponds generally to the maximum amount taken up by the acid at reaction temperature. For instance, when producing 8-22-0, the highest liquid phase temperatures, and consequently the highest conversion levels, are obtained by adding approximately 60 percent of the stoichiometric ammonia to the reactor. This corresponds to approximately 0.21 weight parts ammonia per weight part total acid. A total of 0.35 weight parts ammonia per weight part acid is required to produce 10-34-0.

However, for convenience, it may be desirable to add all the ammonia to the reactor. Excess ammonia will reduce reaction temperature, albeit to a minor extent, and is readily absorbed in the product quench. However, ammonia rates substantially above those required for complete neutralization are of little or no benefit and serve only to increase product pH. Accordingly, the total ammonia injection rate, including the minor amount added to pre-neutralizer 8, if any, should be at least about 0.12 and is generally within the range of 0.12 to about 0.40 weight parts ammonia per weight part $P_2O_5$ plus mineral acid.

Ammonia mass rate should also be taken into account in the design and operation of ammonia jets 17 or similar injection means. Concentrated phosphoric acids are generally very viscous. Therefore, the amount of energy required to adequately disperse the liquid feed can be very high in the absence of any supplemental dispersing effect. While it is not essential, this supplemental effect can be obtained as illustrated in this embodiment by injecting ammonia into the acid spray at high velocities. It is therefore particularly preferred that at least a substantial proportion, e.g., at least about 30 percent, preferably at least 50 percent, of the ammonia added to the reactor, be introduced as a high velocity stream radially inwardly into the acid spray from around the periphery of the acid spray and about one foot or less below the acid spray means at a velocity having an inward radial vector of at least about 200, usually at least about 500, and preferably at least about 1000 feet per second. This manner of ammonia injection accomplishes several functions, the most significant of which are increased liquid phase dispersion and subdivision, and directional control and shaping or containment of the liquid spray within the unconfined reaction zone 11. The remainder of the ammonia, or the total amount if jets are not employed, can be introduced at any point to zone 11, although preferably in a manner that achieves direct contact with the acid spray.

Acid is ejected from means 9 through one or more acid spray means 10 which can be any one of the numerous known apparatus elements for producing dispersed liquid sprays such as nozzles, orifices, jets, or the like. The acid is thus sprayed downwardly into reaction zone 11 where it is intimately contacted with and dispersed by ammonia, preferably introduced by nozzles or jets 17. One suitable spraying means is illustrated schematically in FIGS. 4, 5 and 6 of copending application Ser. No. 591,056, filed June 27, 1974, by Bruce A. Harbolt and Donald C. Young, incorporated herein by reference.

Although the entire reaction system should be contained in a housing 18, the great majority of the liquid spray will pass downwardly into aqueous quench 20 without contacting the interior walls of vapor housing 18. This housing is preferably a substantially gas-tight enclosure having a relatively wide internal diameter of at least about 2 feet, preferably at least about 4 feet, containing the ammonia-acid jet 9 and aqueous quench 20 as illustrated in FIG. 5. The height of enclosure 18 should be sufficient to provide a vertical distance between acid spray means 10 and the upper surface of quench 20 sufficient to allow adequate reaction temperature elevation and polymerization.

The reaction is extremely rapid in these systems and will go to completion in less than 5 seconds, often less than 2 seconds, and generally less than 1 second. Thus the distance between the ammonia-acid jet or jets and product quench 20 should be at least about 1, preferably at least about 2, and is generally at least about 4 feet. Furthermore, to minimize or completely eliminate the contact of dispersed acid droplets with the interior surfaces of housing 18, it is presently preferred that the ratio of the vertical distance between the acid spray and the aqueous quench to the internal diameter of housing 18 be less than about 5.

The short reaction times made possible by this process are far less than those required to obtain comparable conversions by alternative methods, e.g., confined tubular or batch reactors. While the nature and influence of all the factors contributing to these high reaction rates are not known with certainty, much shorter contact times are required. Undoubtedly, the prolonged contact required in the alternative confined liquid phase systems accentuates reactor fouling and corrosion.

The reactor can contain a baffle or shroud 33 surrounding the acid and ammonia injection means 10 and 17, respectively. This shroud does not contain or confine the acid spray. On the contrary, its function is to momentarily contain the high velocity ammonia gas and increases turbulence in the initial stages of the ammonia-acid interaction when ammonia jets are employed. Acid dispersion and surface area are increased while droplet size is reduced, thereby increasing reaction rate. Furthermore, by directing the flow of ammonia downwardly into quench 20, baffle 33 also serves to guide the acid spray droplets in the same direction thereby avoiding substantial contact of those materials with the inside surfaces of housing 18.

For the reasons mentioned above, I prefer that shroud 33 should not be of such length or internal diameter as to significantly confine the acid spray. Obviously some of the acid droplets will contact the shroud interior walls, yet the spray will not be confined to an extent that causes significant droplet coalescence or formation of a continuous liquid phase. Thus the shroud should have a substantially vertical longitudinal axis aligned with the axis of acid spray means 10. It should be completely open at its lower extremity and have a length of about 4 feet or less, preferably about 2 feet or less with a ratio of length to minimum internal diameter of about 10 or less, generally about 5 or less, and preferably less than 3. The artisan will appreciate that any shroud or baffle can be used which will accomplish the above objectives, e.g., cones or square enclosures having the described lengths and radices.

Even though the acid is ejected at relatively high velocity, the reaction between the ammonia and acid is substantially complete within 5 feet, generally within 3 feet, and often within 2 feet of the spray nozzle. Reaction rates are sufficient to create temperatures of at least 400° F., generally between 500° and 750° F., and preferably between about 550° and 700° F. in the acid droplets within these distances.

Nevertheless, depending upon the acid's downward velocity, some additional conversion may be obtained with greater vertical distances, e.g., about 5 feet or 5 to about 10 feet. Of course a similar effect can be achieved by reducing acid velocity. In other words, the same conversion that can be accomplished in a vertical drop of 5 feet might be obtained at lower velocity within 4 feet, all other things being equal. However, this latter qualification is a source of difficulty since, for the reasons mentioned above, the mass velocity through acid ejectors 10 contributes, in large part, to acid dispersion. Obviously the independent variable is contact time and these questions of acid velocity and vertical distance are the dependent variables determining that quantity. However, the system is best described in these respects due to the difficulty in determining contact time per se. It is presently believed that the required conversions can be obtained in less than 3 seconds, generaly in less than 2 seconds, and often even within 1 second or less.

Reaction rate is determined by a number of factors including droplet size, ammonia concentration (water content), reactor pressure, feed acid and ammonia injection temperature and velocity, feed acid $P_2O_5$ concentration, e.g., $H_2O/P_2O_5$ and mineral acid/$P_2O_5$ ratios, impurity level, and ambient gas temperature in zone 11. The influence of most of these variables is completely overshadowed by the effects of droplet size, feed acid $P_2O_5$ content, mineral acid/$P_2O_5$ ratio and ammonia purity.

The ammonia should be substantially anhydrous. While superatmospheric pressures can be used, they are not required to obtain the desired conversions. Both operating and capital cost can be minimized by operating at ambient conditions. In fact, a slight vacuum is created within vapor confinement housing 18 presumably due to the rapid absorption of ammonia in the acid spray and quench 20. The effects of $H_2O/P_2O_5$ and mineral acid/$P_2O_5$ feed ratios are discussed above.

The remaining variable — acid spray efficiency or spray droplet size — is determined by several variables well known in the art. A detailed description of the variables involved in producing liquid sprays or mists is found in Kirk-Othmer, *Encyclopaedia of Chemical Technology*, 2nd Edition, Vol. 18, Interscience Publishers (1969), pages 634–653. A Bibliography giving reference to the work of numerous investigators is also included. The article refers to numerous forms of liquid spraying and atomizing equipment known to the art which are suitable for use in this embodiment.

It is presently preferred, however, that the spray forming means comprise a system in which the ammonia and acid enter the reaction zone through separate lines as illustrated in FIG. 5 although these separate lines can be contained in the same housing, nozzle or spray means. This qualification is very desirable since reaction between ammonia and acid in a confined space such as in a reactor line, pipe reactor or closed mixing nozzle, sufficient to produce a temperature above 500° F. will cause fouling with wet-process acids and corrosion with white acids. Thus the major amounts of ammonia and acid should be ejected from separate orifices. In addition, the cooperation of the ammonia and acid spray means should be such that neutralized or partially neutralized hot acid spray, e.g., 500° F. or higher, is not directed onto the ammonia nozzles.

An apparatus of this type is illustrated in FIGS. 4–6 of Harbolt and Young, supra, wherein annular and peripheral ammonia injection means are positioned relative to each other such that a significant amount of the hot acid does not contact the ammonia injectors or other solid surface of the spray apparatus. In this manner the nozzles or jets are not heated by a hot reaction mixture, and they are cooled internally by incoming feed. Thus they do not present a hot surface for fouling accumulation.

The principal factors controlling acid distribution and droplet size include acid feed velocity, viscosity and nozzle size and design, i.e., Reynolds number, ammonia mass flow rate relative to the acid flow rate, ammonia velocity upon contact with the acid spray, and the position of the ammonia jets, orifices, etc. relative to the acid jets and spray. Droplet size can be reduced by reducing feed acid viscosity at the acid orifice, increasing the velocity of the acid and/or ammonia streams, increasing the relative ammonia mass flow rate, increasing the acid orifice Reynolds number, and positioning the ammonia jets in close proximity to the acid nozzle aligned in a manner to provide a substantial radial component of the ammonia stream relative to the acid stream. One or more of these variables can be adjusted to promote the desired reaction conditions as indicated by liquid phase temperature and/or conversion to polymeric phosphates.

Conversion can be determined by simply catching a sample of the melt ahead of the quench. The polymeric species in the melt are stable, even at elevated temperatures, if isolated from substantial moisture. Thus the dispersed reaction product can be sampled, retained in a sealed container and analyzed to determine conversion level.

Similarly, liquid phase temperature can be approximated by positioning a temperature-sensing device such as a thermister, thermocouple or the like within the acid spray at one or more elevations to determine the maximum temperature obtained within the reaction zone.

Returning to FIG. 5, the melt is passed directly into quench 20 at a temperature and pH sufficient to minimize hydration and depolymerization. This temperature should be less than about 200° F., preferably below about 150° F. The pH should be above about 5.5, preferably between 5.5 and about 8.5. However, product solubility is highest under slightly acidic conditions. Thus pH levels between about 5.5 and about 6.8 are presently preferred. Recycle is controlled at a rate sufficient to rapidly quench the product melt and corresponds to a volumetric recycle ratio of at least 10, preferably between about 20 to about 60.

Quench medium 20, containing dissolved ammonium phosphate product, is passed by lines 21, 22, 24 and 26 through heat exchangers 3 and 23 and cooler 25 to product accumulator 27. Additional ammonia required to produce the desired product, e.g., 10-34-0, can be added either in the reaction zone or at any point in the recycle system. Makeup water is added as required to accumulator 27 via line 29 or other means as required to obtain the desired concentration and product is withdrawn via line 28.

While the aforegoing description has centered primarily on the adaption of these concepts to the preferred embodiment involving an unconfined liquid phase reaction system, those concepts are obviously applicable to any systems involving the substantially adiabatic neutralization of phosphoric acid with ammonia to produce ammonium phosphate products containing substantial amounts of polyphosphates. Illustrative of alternative systems are either batch neutralizers or continuous tank or pipe reactors such as those illustrated in U.S. Pat. Nos. 3,752,990; 3,734,708; 3,382,059; 2,902,342 and 3,730,700.

The most common alternative systems are the pipe reactors illustrated in several of these patents which generally operate by the introduction of the acid feed and ammonia into one end of an elongate tube. The tube can be either straight or curvilinear. Reaction proceeds throughout the length of the tube and neutralized product is recovered from the opposite extremity and is generally passed directly to a quench zone.

EXAMPLE

This example demonstrates the conversion of a wet-process acid having an $H_2O/P_2O_5$ molar ratio of 7.5 containing about 10 weight percent incident metallic impurities comprising aluminum, iron and magnesium expressed as the corresponding oxides. Under normal circumstances, using only the autogenous heat of neutralization, an acid having an $H_2O/P_2O_5$ ratio of 7.5, could, at best, be converted to a product containing less than 3 weight percent polyphosphate even in a system which is 100 percent efficient.

Prior to introduction into the reaction zone the feed acid was mixed with sufficient 99 percent sulfuric acid to obtain an $H_2SO_4/P_2O_5$ molar ratio of 0.96. This mixture was then injected from the acid spray means in a system such as that illustrated in FIG. 5. The acid and ammonia spray means were substantially as illustrated schematically in that FIG. The nozzle included a 4.5 inch O. D. cylindrical housing having a lower base plate perforated by 37 acid orifices three-eighths inch in diameter on ½-inch centers. Thirty-seven ammonia orifices 0.1175 inch I.D. and 0.25 inch O.D. were positioned concentrically within each of the acid orifices leaving an annular spacing (annular acid orifice) between the external surface of the ammonia orifices. Each of the ammonia orifices extended approximately one-fourth inch downwardly below the base plate. The lower portion of the assembly was surrounded by twelve 0.18 inch I.D. stainless steel ammonia jets spaced evenly about the circumference of the housing, the open ends of which tubes pointed radially inwardly into the spray created by the acid and ammonia jets mentioned above, at a level approximately 1¼ inch below the ammonia orifices positioned within the acid jets in the base plate.

The radial ammonia jets, in turn, were surrounded by a cylindrical baffle shroud 4 inches in length and 4 inches I.D. positioned approximately as illustrated at 33 in FIG. 5, and being axially aligned with the cylindrical housing to provide a turbulent gas mixing zone immediately below the housing. This assemblage was contained in a substantially vapor-tight rectangular vapor housing 3 feet square, containing a quench zone in the lower portion thereof and having a vertical dimension between the acid nozzle and the quench surface of approximately 5 feet.

The mixture of sulfuric and wet-process acid was passed to the acid nozzles at a rate of about 10 gallons per minute at a temperature of 150° F. Ammonia was ejected from the 49 ammonia nozzles at a rate of 2.5 gallons per minute corresponding to 0.6 weight parts ammonia per weight part $P_2O_5$ or 0.38 weight parts ammonia per weight part $P_2O_5$ plus $H_2SO_4$. The gas velocity through the axial and radial ammonia orifices was in excess of 1000 feet per second.

The acid and ammonia spray was directed downwardly into the aqueous quench which passed through the unconfined reaction zone at a rate corresponding to a recycle ratio of 20/1 at a temperature of 150° F. Recycle pH was maintained at 6.5 by the addition of 0.11 weight parts ammonia per weight part $P_2O_5$ to the recycle system.

The product solution contained 13 weight percent nitrogen, 26 weight percent $P_2O_5$, and 6 weight percent sulfur. Seventy-four percent of the $P_2O_5$ was present as polyphosphate.

I claim:

1. The method of producing stable, aqueous solutions of ammonium polyphosphate product having an equivalent polymeric $P_2O_5$ content of at least about 25 percent of the total $P_2O_5$ present and higher than the polymeric content obtainable from the acid feed hereinafter defined with only the autogenous heat of reaction between ammonia and the acid mixture hereinafter defined, from a phosphoric acid feed having a polyphosphate content at least 10 percent less than said product determined as a percentage of total $P_2O_5$, including the steps of;
   1. mixing said feed with an amount of substantially anhydrous mineral acid selected from the group consisting of sulfuric, nitric and hydrochloric acids and combinations thereof, in an amount of at least about 0.1 mole of said mineral acid per mole of $P_2O_5$ and sufficient to produce a reaction temperature of about 500° to about 750° F. upon neutralization of the resultant acid mixture with ammonia;
   2. reacting said acid mixture with at least about 0.12 weight parts of anhydrous ammonia per weight part of said acid mixture under conditions sufficient to produce a molten product melt at said reaction temperature by the autogenous heat of neutralization, said temperature being sufficient to increase the polymeric $P_2O_5$ content of said acid by at least about 10 percent and form said product of which at least about 25 percent of said $P_2O_5$ is present as polyphosphate; and
   3. quenching the reaction product to a temperature of about 200° F. or less by immersion in an aqueous quench medium.

2. The method of claim 1 wherein said phosphoric acid feed has an $H_2O/P_2O_5$ ratio of about 3.3 to about 15, and said mineral acid and ammonia concentrations are correlated to produce a maximum reaction temperature of 500° to 750° F. sufficient to increase the polyphosphate content of said phosphoric acid by at least about 20 percent and form said ammonium polyphosphate product of which at least 50 percent of the total $P_2O_5$ is present as polyphosphates.

3. The method of claim 1 wherein said phosphoric acid feed is a wet-process acid containing cogeneric impurities and having an $H_2O/P_2O_5$ molar ratio of at least about 5, said feed is mixed with an amount of said mineral acid sufficient to produce an acid mixture having a molar ratio of mineral acid to $P_2O_5$ at least 10 percent greater than that represented by the correlation for 25 percent polymer in FIG. 1 at an $H_2O/P_2O_5$ feed molar ratio corresponding to that of said phosphoric acid feed.

4. The method of claim 1 wherein said phosphoric acid feed has an $H_2O/P_2O_5$ molar ratio of about 5 to about 15 and contains less than about 25 percent of the $P_2O_5$ as polymeric phosphates, said mineral acid/$P_2O_5$ molar ratio is about 0.17 to about 4 and corresponds at least to the value determined by the expression:

$$[\text{mineral acid}]/P_2O_5 = 0.267 [H_2O/P_2O_5] - 1.16$$

and said ammonia concentration, and $H_2O/P_2O_5$ and acid ratios are correlated to produce a reaction temperature sufficient to form a product in which at least about 50 percent of the equivalent $P_2O_5$ is present as polyphosphates.

5. The method of claim 3 wherein said mineral acid contains anhydrous sulfuric acid, including the step of adding sufficient ammonia to said acid mixture or quenched reaction product, or both, to neutralize at least 90 percent of said sulfuric acid.

6. The method of claim 3 wherein said mineral acid comprises anhydrous hydrochloric acid including the steps of adding sufficient ammonia to said acid mixture prior to said quench to substantially convert said hydrochloric acid to ammonium chloride, separating said ammonium chloride from said reaction product as a vapor phase prior to quenching said product, and recovering said reaction product containing less than 50 percent of the chloride ion added with said hydrochloric acid.

7. The method of producing stable, aqueous solutions of ammonium polyphosphate product having an equivalent polymeric $P_2O_5$ content of at least about 25 percent of the total $P_2O_5$ present, which polymeric content is higher than the polymeric $P_2O_5$ content obtainable from the acid feed hereinafter defined with only the autogenous heat of reaction between said acid feed and ammonia, from a phosphoric acid feed having an $H_2O/P_2O_5$ molar ratio of at least about 3.3 and a polyphosphate content at least 10 percent less than said product determined as a percentage of total $P_2O_5$, including the steps of:
1. mixing said feed with an amount of substantially anhydrous mineral acid selected from the group consisting of sulfuric, nitric and hydrochloric acids and combinations thereof, in an amount corresponding to at least about 0.05 moles of said mineral acid per mole of $P_2O_5$ in said feed and sufficient to produce a reaction temperature of at least about 400° F. upon neutralization of the resultant acid mixture with ammonia;
2. reacting said acid mixture with at least about 0.12 weight parts of substantially anhydrous ammonia per weight part of said acid mixture under conditions sufficient to produce a molten product melt at said reaction temperature by the autogenous heat of neutralization of said acid mixture, said reaction temperature being sufficient to increase the polymeric $P_2O_5$ content of said acid by at least about 10 percent and form said product of which at least about 25 percent of said $P_2O_5$ is present as polyphosphates;
3. said reacting of said acid mixture with said ammonia being effected by spraying said acid mixture from an acid spray means downwardly through an ammonia atmosphere in an unconfined reaction zone having a mimimum internal diameter of at least about 2 feet and a height of at least about 2 feet determined as the distance between said acid spray means and the upper surface of an aqueous quench hereinafter defined, and into a liquid phase aqueous quench under conditions sufficient to produce a dispersed liquid acid spray, introducing ammonia into said reaction zone at a rate of at least about 0.12 weight parts ammonia per weight part of said acid mixture sufficient to surround said acid droplets with said ammonia, and reacting said ammonia with said acid at a rate sufficient to heat the unconfined acid droplets to a temperature of at least about 400° F., and increase the polymeric $P_2O_5$ content of said acid mixture by an amount corresponding to at least about 10 percent of the total $P_2O_5$ present before said acid spray contacts said aqueous quench.

8. The method of claim 7 wherein said unconfined reaction zone, acid spray means, ammonia and aqueous quench are contained within a substantially gas-tight housing having an internal diameter of at least about 2 feet, the upper portion thereof containing said spray means and the lower portion thereof containing said aqueous quench, the vertical distance between said spray means and the upper surface of said aqueous quench being at least about 2 feet and the ratio of said vertical distance to said internal diameter being less than about 4.

9. The method of claim 8 wherein said acid mixture has a molar ratio of said mineral acid to said $P_2O_5$ of about 0.17 to about 4, said acid feed has an $H_2O/P_2O_5$ molar ratio of at least about 4.5, and said ratio of said mineral acid to said $P_2O_5$ and the $H_2O/P_2O_5$ ratio of said acid feed are sufficient to obtain a reaction temperature in said droplets of about 500° to about 750° F. sufficient to increase said polymeric $P_2O_5$ content by at least about 10 percent within about 5 feet or less of said acid spray means and produce said ammonium polyphosphate produce in which at least 25 percent of the $P_2O_5$ is present as polymeric $P_2O_5$.

10. The method of claim 7 wherein said acid mixture has a molar ratio of said mineral acid to said $P_2O_5$ of at least about 0.1, at least 50 percent of said ammonia is introduced to said reaction zone by jetting said ammonia into said acid spray at an elevation within one foot below said acid spray means and around the full periphery of said spray in an inward direction and at a velocity such that the jetted ammonia has an inward radial velocity vector of at least about 200 feet per second, and said acid spray, ammonia jet, $H_2O/P_2O_5$ ratio and mineral acid addition rate are correlated to heat said droplets to a temperature between 500° and 750° F. and increase said polymeric $P_2O_5$ content by at least about 10 percent within about 5 feet or less of said acid spray means.

11. The method of claim 10 wherein said acid mixture has a molar ratio of said mineral acid to said $P_2O_5$ of at least about 0.17.

* * * * *